(12) United States Patent
Beaufrere et al.

(10) Patent No.: US 8,978,133 B2
(45) Date of Patent: Mar. 10, 2015

(54) CATEGORIZING SOCIAL NETWORKING SYSTEM USERS BASED ON USER CONNECTIONS TO OBJECTS

(71) Applicant: Facebook, Inc., Menlo Park, CA (US)

(72) Inventors: Marion Beaufrere, Dublin (IE); Jan Smole, Dublin (IE); Rasit Onur Coskunseda, Dublin (IE); Ziad B Traboulsi, Dublin (IE); Nasser Ahmed Al-Sherif, Dublin (IE); Allan Stewart, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 53 days.

(21) Appl. No.: 13/867,529

(22) Filed: Apr. 22, 2013

(65) Prior Publication Data

US 2014/0317732 A1 Oct. 23, 2014

(51) Int. Cl.
*G06F 11/00* (2006.01)
*H04L 29/06* (2006.01)

(52) U.S. Cl.
CPC .................................. *H04L 63/1441* (2013.01)
USPC ......................................................... 726/22

(58) Field of Classification Search
CPC ............ H04L 63/1466; H04L 63/1408; H04L 63/145
USPC ......................................................... 726/22
See application file for complete search history.

(56) References Cited

U.S. PATENT DOCUMENTS

| 8,495,709 | B1 * | 7/2013 | Cooper et al. ...................... 726/4 |
| 8,719,940 | B1 * | 5/2014 | Higbee et al. ................... 726/24 |
| 2011/0154498 | A1 * | 6/2011 | Fissel et al. ..................... 726/25 |
| 2012/0158851 | A1 | 6/2012 | Kelmenson et al. |
| 2012/0166532 | A1 | 6/2012 | Juan et al. |

OTHER PUBLICATIONS

Hua, M., et al., "Updating Features Based on User Actions in Online Systems," U.S. Appl. No. 13/690,254, filed Nov. 30, 2012.
Kabiljo, I., et al., "Customized Predictors for User Actions in an Online System," U.S. Appl. No. 13/689,969, filed Nov. 30, 2012.
Shalita, A. M., et al., "Dynamic Expressions for Representing Features in an Online System," U.S. Appl. No. 13/690,088, filed Nov. 30, 2012.

* cited by examiner

*Primary Examiner* — Teshome Hailu
(74) *Attorney, Agent, or Firm* — Fenwick & West LLP (57) ABSTRACT

When a social networking system receives a report of malicious activity, the social networking system calculates disabled connectivity score for a user reporting the activity or identified by the report. The disabled connectivity score indicates how strongly the user is associated with other objects that have been disabled by the social networking system. Hence, the disabled connectivity score provides a measure of the user's trustworthiness that is used to determine a type of action to be taken in response to the report. Examples of actions that may be taken when a report is received include ignoring the report, further reviewing the report, or taking remedial action by disabling or deleting an object maintained by the social networking system that is the subject of the report.

23 Claims, 3 Drawing Sheets

CATEGORIZING SOCIAL NETWORKING SYSTEM USERS BASED ON USER CONNECTIONS TO OBJECTS

BACKGROUND

This invention relates generally to social networking systems, and in particular to determining whether social networking system users are malicious on interactions of the users with objects maintained by the social networking system.

Social networking systems allow users to connect to and communicate with other users of the social networking system. Users create profiles on the social networking system that are tied to their identities and include information about the users, such as interests and demographic information. Because of the increasing popularity of social networking systems and the significant amount of user-specific information maintained by social networking systems, a social networking system presents an ideal forum for users to share their interests and experiences with other users. For example, a social networking system allows its users to upload content, exchange information, organize events, post content for presentation to other users, and communicate messages to each other. However, while performing interactions via a social networking system, users may engage in malicious activities that may cause social harm. For example, users may post racist comments, violent videos, or child pornography.

Conventional social networking systems protect users by providing mechanisms for users to report malicious activity or malicious content. For example, users flag content they find offensive or inappropriate or report bullying or harassment by communicating a message to the social networking system. However, the target user's biases or personal preferences may make reports of malicious activity or content inaccurate. Additionally, users may not always take the time to report activity or content they think is malicious. Furthermore, the amount of content available on a social networking system may prevent malicious activity or content from being accessed by users that would report the malicious activity or content. Hence, social networking systems may be unable to take action against malicious activity or content that is unreported by users, and may allocate resources to reviewing false or unreliable reports of malicious activity and content.

SUMMARY

Social networking systems allow users to share information with other users by uploading content, exchanging information, organizing events, communicating messages with each other, and a variety of other activities. However, some of these activities may be malicious activities causing cause social harm (e.g., unethical, immoral, and illegal activities). For example, users may engage in malicious activities such as bullying, making plans to carry out terrorist activities, or posting pictures of racist symbols. While social networking system users may report malicious content, prompting the social networking system to perform remedial activities such as deleting content reported to be malicious or disabling users reported to be engaged in malicious activity. However, this does not address malicious activities or content that go unreported by users (e.g., due to the volume of activities and content to which some users are never exposed, due to users who recognize malicious activity or content but do not care to report it, or due to unreliable reports resulting from user bias or personal preferences).

To improve identification of malicious activities or content, when a report of malicious activity or content is received from a user of a social networking system, the social networking system computes a disabled connectivity score for a target user based on other objects maintained by the social networking system that are connected to the target user and that have been disabled or deleted by the social networking system because they have been confirmed to be malicious. In one embodiment, the target user is the user from which the report was received; however, in other embodiments, the target user is a user identified by the report, such as a user identified by the report as being engaged in malicious activity (e.g., bullying). Examples of objects connected to the target user include other users, groups, content items, etc. Objects may be directly connected to the target user or indirectly connected to the target user through a connection to an object connected to the target user (e.g., a user who liked a page that the target user also liked). The disabled connectivity score indicates the trustworthiness of the target user's report and determines an action for the social networking system to take based on the report. For example, the disabled connectivity score indicates that a report of malicious activity should be ignored because many of the objects to which the target user is connected have been determined to be malicious and disabled or deleted by the social networking system, suggesting that the user's does not have good character.

A disabled connectivity score may be calculated for objects maintained by the social networking system other than users. For example, a disabled connectivity score is calculated for uploaded content or for a page maintained by the social networking system. Additionally, the social networking system may record the reasons for which objects connected to the target user have been disabled or deleted, and calculate the disabled connectivity score based in part on the reasons for disabling objects connected to the target user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows its users to share information with other users by uploading content, exchanging information, organizing events, communicating messages with each other, and a variety of other activities. However, some of these activities may be malicious activities causing cause social harm (e.g., unethical, immoral, and illegal activities). For example, uploaded content or interactions may include content or activities that are unethical, immoral, illegal, or otherwise cause social harm. The social networking system allows users to report malicious activity or content and takes remedial action against such activity or content. For example, the social networking system deletes content reported as malicious, disables users performing malicious activities or associated with malicious content, restricts user access to content reported as malicious, or performs another suitable remedial action to enhance user experience.

To mitigate malicious content or activities, the social networking system computes a disabled connectivity score for a social networking system user associated with a report of malicious activity or content (the "target user"). For example, the social networking system determines a disabled connectivity score for the user providing a report of malicious activity or content or for a user identified by the report of malicious activity or content. The disabled connectivity score reflects the relationship between the target user and other objects to which the target user is connected that have been deleted or disabled by the social networking system for being malicious. Based on the disabled connectivity score for the target user, the social networking system determines whether to take action against malicious activity or content identified by the report.

A disabled connectivity score for a target user may be calculated based on first order connections, which are objects to which the target user is directly connected. Examples of first order connections for calculating the disabled connectivity score include: the percentage of users connected to the target user that have been disabled, the percentage of pages that have been deleted and that the target user has expressed a preference for ("liked") or administered, the percentage of groups the target user has created that have been deleted, the percentage of groups the target user has administered that were deleted, the percentage of groups having the target user as a group that have been deleted, and the percentage of reports of malicious activity provided by the target user on which the social networking system took action. Additionally, second order connections, which are objects not directly connected to the target user but connected to an additional object that is connected to the target user, may be used to calculate the target user's disabled connectivity score. Examples of second order connections include: the percentage of disabled users or administrators who have liked a page that the target user also liked or administered and the percentage of disabled administrators or disabled members of groups that the target user created, administered, or include the target user as a member.

Based on the disabled connectivity score, the social networking system determines the trustworthiness of the target user and accordingly determines a type of action to perform in response to the report. Examples of types of actions include: disabling a user's account on the social networking system, deleting an object associated with the reported activity, ignoring the report, or additionally reviewing the reported activity. For example, a high disabled connectivity score for a target user indicates that a high percentage of objects to which the user is connected have been disabled or deleted by the social networking system, so the target user's report is not trustworthy and is ignored. Alternatively, a low disabled connectivity score indicates the target user is trustworthy, so a remedial action is taken in response to a report received from the target user. In one embodiment, if a disabled connectivity score for a target user is within an intermediate range, the reported activity may be identified for additional review (e.g., entered into a manual review queue). A disabled connectivity score may also be used to prioritize responses to reports of malicious activity by providing a measure of the likely maliciousness of reported activity.

In one embodiment, a disabled connectivity score accounts for specific reasons for disabling objects connected to a target user. For example, a disabled connectivity score for a target user accounts for an object connected to the target user being disabled because it was spam while another disabled connectivity score for a target user accounts that an object connected to the target user being disabled because it was associated with terrorist activity. A disabled connectivity score may be calculated for objects maintained by the social networking system other than users. For example, a disabled connectivity score is calculated to determine how the social networking system maintains content associated with a user having a disabled account.

Signals Used to Calculate a Disabled Connectivity Score

Signals associated with a target user of a social networking system are used to calculate a disabled connectivity score for the target user. Examples of signals used for calculating a disabled connectivity score include existence of disabled or deleted objects connected to the target user. Objects connected to the target user include first order connections and second order connections. A first order connection is an object maintained by the social networking system and directly connected to the target user (e.g., a user or a page connected to the target user). A second order connection is an object that is not connected to the target user but is connected to an additional object that is connected to the target user (e.g., an additional user expressing a preference for a page for which the target user expressed a preference). In one embodiment, the frequency or type of interactions between the target user and disabled or deleted objects determines whether disabled or deleted objects are used to calculate the disabled connectivity score for the target user. For example, objects are used to calculate the disabled connectivity score if the target user's frequency of interaction with the objects is greater than a threshold value or if the target user provided information included on a deleted page.

Figure 1:
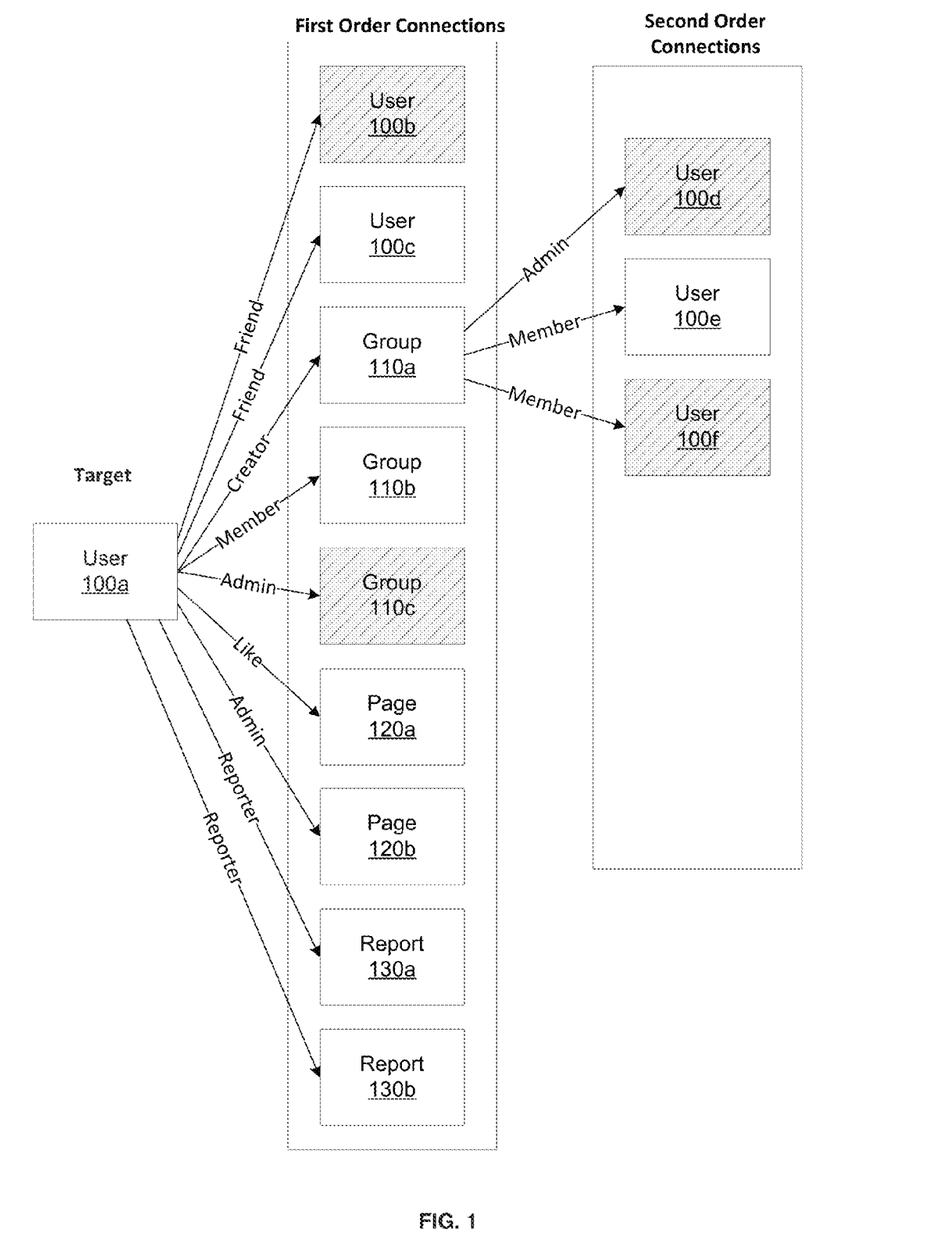
FIG. 1 is a process flow diagram of data for calculating a disabled connectivity score for a target user of the social networking system, in accordance with an embodiment of the invention.

FIG. 1 is a process flow diagram showing an example of data associated with a target user 100*a* by a social networking system associated with a target user 100*a* used as signals for calculating a disabled connectivity score for the target user 100*a*. As shown in FIG. 1, first order connections of the target user 100*a* include other users 100*b*, 100*c* directly connected to the target user 100*a*, a group 110*a* the target user 100*a* has created, a groups 110*b* having the target user 100*a* as a member, a group 110*c* the target user 100*a* has administered, pages (or other objects) for which the target user 100*a* expressed a preference (pages the target user liked) 120*a*, pages the target user 100*a* has administered 120*b*, and reports 130*a*, 130*b* of malicious activity of content associated with the target user 100*a*. Additionally, second order connections of the target user 100*a* include other users 100*d*, 100*e*, and 100*f* that are not connected to the target user 100*a* but connected to objects to which the target user 100*a* is directly connected. In the example of FIG. 1, second order connections include a user 100*d* that administered a group 110*a* the user created, administered, or included the target user 100*a* as a member, and users 100*e*, 110*f* who have been members of a group 110*a* t the target user 100*a* created, administered, or included the target user 100*a* as a member. Second order connections of the target user 100*a* also include users that expressed a preference for an object connected to the target user 100*a* or that are otherwise connected to an object that is also connected to the target user 100*a*.

In the example of FIG. 1, a user 100*b* connected to the target user 100*a*, a group 110*c* administered by the target user 100*a*, a user 100*d* administering a group 110*a* created by the target user 100*a*, and a user 100*f* that is a member of a group 110a created by the target user 100a have been confirmed to be disabled or deleted by the social networking system for engaging in malicious activity or including malicious content. For example, a social networking system administrator manually verifies if an object or user performs malicious activity or includes malicious content. Administrators may review activities of a user or content posted by a user to determine the user is associated with malicious activity. Confirmation of malicious activity or content may also be accomplished using keyword searches provided by a system administrator through a user interface of a software application, through a script, or through an input file. The keywords correspond to terms typically found in content associated with malicious activity, so a keyword search identifies if objects connected to the target user 100a include one or more of the identified keywords. Confirmation of malicious activity or content is further disclosed in U.S. application Ser. No. 12/975,213, filed on Dec. 21, 2010, which is incorporated herein by reference in its entirety.

Although FIG. 1 illustrates an example of signals used for classifying a target user 100a as malicious or non-malicious, similar signals may be used to more generally categorize objects or users based on other criteria. For example, the first order connections and second order connections shown in FIG. 1 may also be used to categorize a target user 100a based on religious activities, sports activities, academic activities, etc. For example, information about first order connections and second order connections of a target user 110a is used to categorize the target user 100a based on their interest in a particular style of music. Additionally, information from first order connections and second order connections to an object other than a user (e.g., a page, a group, an event, etc.) may be used to categorize the object as associated with malicious activity or content (or any other suitable categorization).

System Architecture

Figure 2:
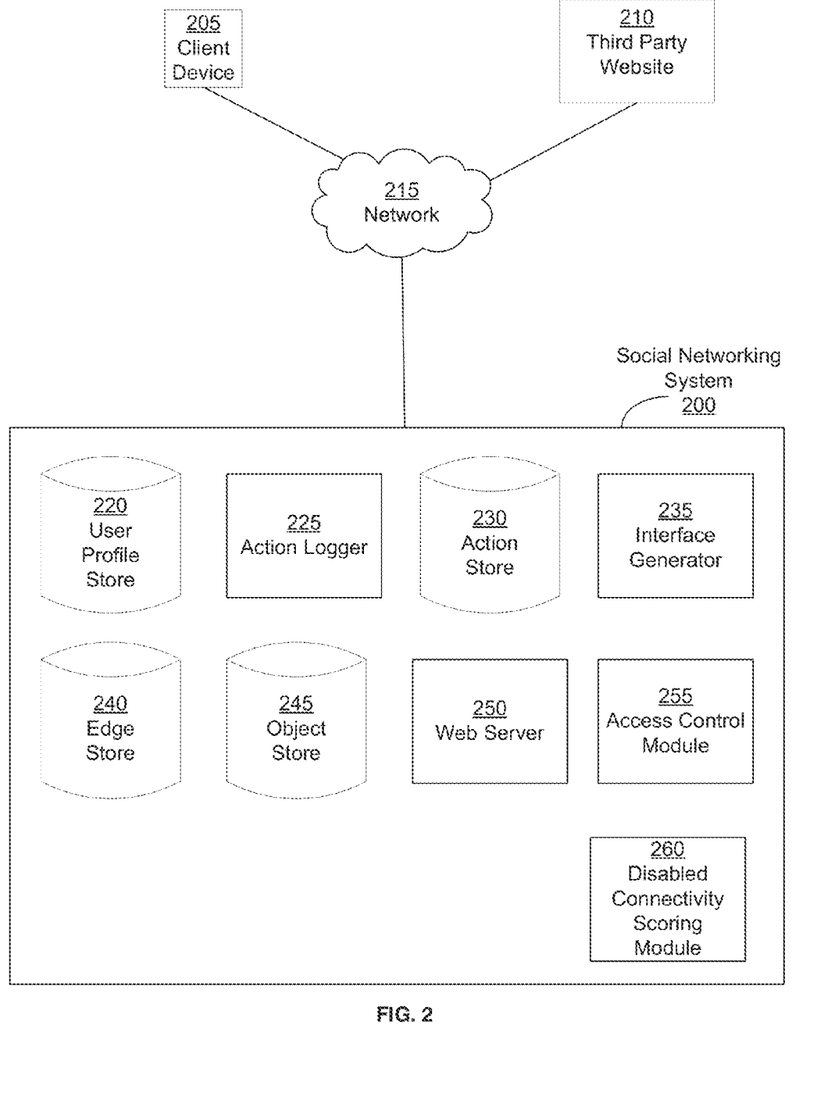
FIG. 2 is a block diagram of a system environment including a social networking system, in accordance with an embodiment of the invention.

FIG. 2 is a block diagram of one embodiment of a system environment including a social networking system 200. In the example of FIG. 2, the system environment comprises a client device 205, a network 215, one or more third party websites 210, and a social networking system 200. However, in alternative configurations, different and/or additional components may be included in the system environment. The embodiments described herein can be adapted to online systems that are not social networking systems.

The client device 205 comprises a computing device capable of receiving user input as well as transmitting and/or receiving data via the network 215. In one embodiment, the client device 205 is a conventional computer system, such as a desktop or laptop computer. In another embodiment, the client device 205 may be a device having computer functionality, such as a personal digital assistant (PDA), mobile telephone, smart-phone or similar device. The client device 205 is configured to communicate via the network 215. In one embodiment, the client device 205 executes an application allowing a user of the client device 205 to interact with the social networking system 200. For example, the client device 205 executes a browser application to enable interaction between the client device 205 and the social networking system 200 via the network 215. In another embodiment, the client device 205 interacts with the social networking system 200 through an application programming interface (API) that runs on a native operating system of the client device 205, such as IOS® or ANDROID™.

The client device 205 is configured to communicate via the network 215, which may comprise any combination of local area and/or wide area networks, using both wired and wireless communication systems. In one embodiment, the network 215 uses standard communications technologies and/or protocols. Thus, the network 215 may include communication channels using technologies such as Ethernet, 802.11, worldwide interoperability for microwave access (WiMAX), 3G, 4G, code division multiple access (CDMA), digital subscriber line (DSL), etc. Similarly, the networking protocols used on the network 215 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over the network 215 may be represented using technologies and/or formats including hypertext markup language (HTML) or extensible markup language (XML). In addition, all or some of the communication channels may be encrypted using conventional encryption technologies such as secure sockets layer (SSL), transport layer security (TLS), and Internet Protocol security (IPsec). The third party website 210 may be coupled to the network 215 for communicating with the social networking system 200.

In the example shown by FIG. 2, the social networking system 200 includes a user profile store 220, an action logger 225, an action store 230, an interface generator 235, an edge store 240, an object store 245, a web server 250, an access control module 255, and a disabled connectivity scoring module 260. In other embodiments, the social networking system 200 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user account that is typically associated with a single user profile, which is stored in the user profile store 220. A user profile includes declarative information about the user that was explicitly shared by the user, and may also include information inferred by the social networking system 200. A user profile may include multiple data fields, each describing one or more attributes of the corresponding user of the social networking system 200. Hence, user profile information stored in the user profile store 220 describes various social networking system users, including biographic, demographic, and other types of descriptive information, such as work experience, educational history, gender, hobbies or preferences, location and any other suitable information. User profile information may also include data describing one or more relationships between a user and other users. Additionally, the user profile store 220 may also store other information provided by the user, for example, images, or videos. A user profile in the user profile store 220 may also maintain references to actions performed by the corresponding user and stored in the action store 230.

While user profiles in the user profile store 220 are frequently associated with individuals, allowing people to interact with each other via the social networking system 200, user profiles may also be stored for entities such as businesses or organizations. This allows an entity to establish a presence on the social networking system 200 for connecting and exchanging content with other social networking system users. While an administrator or individual associated with the entity creates the user profile for the entity, the entity is identified as the account-holder associated with the user profile. The entity may post information about itself, information about its products, including catalogs of products, or provide other information to users of the social networking system 200 accessing a brand page associated with the entity's user profile. Other users of the social networking system 200 may connect to the brand page to receive information posted to the brand page or to receive information from the entity associated with the brand page. A user profile associated with an entity may provide users with background or informational data about the entity.

The action logger 225 receives communications describing user actions internal to and external to the social networking system 200. The action logger 225 populates the action store 230 with information describing user actions. When a user performs an action using the social networking system 200, the action logger 225 adds an entry to the action store 230 describing the action. Examples of actions include: posting a comment on a page, sending a message to another user, posting a photo, changing relationship status with another user, and attending an event. In addition, a number of actions described in connection with other objects are directed at particular users, so these actions are associated with those users as well. Some actions may be taken by users while not connected to the social networking system 200 and communicated to the social networking system 200 for storage when a connection is established.

The action store 230 maintains information describing actions by social networking system users internal to the social networking system 200, as well as actions performed via third party websites 210 that communicate information to the social networking system 200. Users may interact with various objects maintained by the social networking system 200, and these interactions are stored in the action store 230. Examples of actions or interactions stored by the action store 230 include: commenting on posts, sharing links, tagging objects, and checking-in to physical locations via a mobile device or other client device 205. Additional examples of interactions with objects on the social networking system 200 included in the action store 230 include commenting on a photo album, transmitting messages to another user, joining an event, joining a group, becoming a fan of a brand page, creating an event, authorizing an application, using an application, interacting with an advertisement, and engaging in a transaction.

The interface generator 235 generates one or more interfaces, such as web pages, including content from the social networking system 200. For example, interfaces generated by the interface generator 235 include images, video, profile information, or other data. The interface generator 235 also generates one or more interfaces allowing the social networking system 200 to request information from users and for users to provide information to the social networking system 200 via the client device 205 and the network 215. For example, the interface generator 235 generates a form for a user to provide biographic information, such as the user's age, for inclusion in the user's user profile. When other users request a user's profile page, the interface generator 235 retrieves data from the profile store 220 and generates a representation of the information in the user profile for presentation by the client device 205.

The interface generator 235 also generates a reporting interface allowing users to report suspected malicious activity performed other users of the social networking system 200 or malicious content associated with other users of the social networking system 200. For example, the reporting interface allows a user to report a story included in a newsfeed presented to the user that includes hate speech, nudity, depicts drug use, or other offensive content. The reporting interface may display options allowing a reporting user to select a type of malicious activity or content being reported or include a data entry region allowing a user to enter a text description of the malicious activity or content being reported. Based on information received from the reporting user through the reporting interface, the interface generator 235 generates a report identifying the malicious activity or content for review by the social networking system 200. Based on information about the report and the reported content or action, the social networking system 200 determines a type of action to take in response to the report as further described below in conjunction with FIG. 3.

The edge store 240 includes information describing connections between users and other objects in the social networking system 200 as edges. Some edges may be defined by users, allowing users to specify their relationships with other users. For example, users may generate edges with other users that parallel the users' real-life relationships, such as friends, co-workers, partners, and so forth. Generally, establishing a connection to a user in a social networking system 200 allows access to more information about the user to which the connection was established than would be available to unconnected users. For example, users connected to each other may receive informational updates about each other, including actions performed by each user on the social networking system 200, via stories presented on newsfeeds. Other edges are generated when users interact with objects in the social networking system 200, such as expressing interest in a page on the social networking system 200, sharing a link with other users of the social networking system 200, or commenting on posts made by other users of the social networking system 200.

The edge store 240 also stores information about edges, such as affinity scores for objects, interests, and other users. Affinity scores, or "affinities," may be computed by the social networking system 200 over time to approximate a user's interest in an object, interest, and other users in the social networking system 200 based on the actions performed by the user. A user's affinity may be computed by the social networking system 200 over time to approximate a user's interest for an object, interest, or other user in the social networking system 200 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 240, in one embodiment. Alternatively, each interaction between a user and a specific object is stored as a separate edge. In some embodiments, connections between users may be stored in the user profile store 220, or the user profile store 220 may access the edge store 240 to determine connections between users.

The object store 245 stores information about content maintained by the social networking system 200. Different content "items," each representing individual pieces of content provided by the social networking system 200 to users, are stored as objects in the object store 245. Examples of objects include applications (e.g., a game playable within the social networking system 200), events (e.g., a concert that users may attend), groups, pages, products or services (e.g., clothing, electronics, cleaning services, or beauty services) media items (e.g., pictures, videos, audio, text, or any other type of media content), locations associated with a user (e.g., "Santa Clara, Calif., USA"), concepts or other terms (e.g., "Victorian literature"), or other suitable data presented to users. The object store 245 may also store objects representing other data generated by social networking system users, such as messages, status updates, photos, videos, comments, notes, and postings. An object in the object store 245 may represent an entity existing within the social networking system 200 (e.g., an application available on the social networking system 200), an entity existing outside the domain of the social networking system 200 (e.g., a website), or a real-world entity (e.g., a sports team or a retail store).

The object store 245 may store data for generating content presented to social networking system users, such as code of an application or image data associated with image media. Alternatively, for objects representing entities outside of the social networking system 200, the object store 245 includes a pointer or a reference to a destination associated with an entity, such as the uniform resource locator (URL) of an external media item. Additionally, the object store 245 may store metadata associated with objects, such as a name describing the object (e.g. "Charles Williams" for a page for a person, "Birthday Reminder" for an application, or "Penguin Fanciers" for a group), an image representing the object (e.g., a user profile picture), or one or more tags assigned to the object by users (e.g. the textual strings "game," "crime," and "strategy" for a strategy game application). Different types of objects may have different types of metadata, such as a set of associated users for a group, a media type (e.g., "video") for a media item object, and a unique user identifier or name tokens (e.g., separate first and last names "Charles" and "Williams") for a an object representing a person.

The web server 250 communicates data between the social networking system 200 and the client device 205, as well as one or more third party websites 210, via the network 215. The web server 250 serves web pages, as well as other content, such as JAVA®, FLASH®, XML and so forth. In one embodiment, the web server 250 receives and routes messages between the social networking system 200 and the client device 205, for example, instant messages, queued messages (e.g., email), text and short message service (SMS) messages, or messages sent using any other suitable messaging technique. A user may send a request to the web server 250 to upload information, for example, images or videos that are stored in the object store 245. Additionally, the web server 250 may provide application programming interface (API) functionality to send data directly to native client device operating systems, such as IOS®, ANDROID™, WEBOS® or RIM®.

The access control module 255 determines whether a particular user may access certain information stored on the social networking system 200. A user's access to information may be determined by privacy settings associated with the user's user profile, the type of information, authorization granted to the user, etc. The social networking system 200 may modify a user's access to information if the social networking system 200 determines that the user is engaged in malicious activity. For example, if the social networking system 200 determines that a user has posted an image of a hate symbol (e.g., a swastika), the access control module 255 may disable the posting user's account or suspend the posting user's ability to post content permanently or temporarily (e.g., while further investigation is conducted). Similarly, the access control module 255 may restrict or disable users' access to content if the social networking system 200 determines that the content is malicious. For example, if content posted to a page depicts drug use, the access control module 255 may delete the content.

The disabled connectivity scoring module 260 calculates a disabled connectivity score for a user associated with a report of malicious activity or content and determines an action to be taken by the social networking system 200 in response to receiving the report. When a report of malicious activity or content is received by the social networking system 200, the disabled connectivity scoring module 260 computes a disabled connectivity score for a target user or a target object (e.g., the reporting user or another user or object maintained by the social networking system 200 and associated with the report). The disabled connectivity score reflects associations between the target user or target object and other objects or users that have been deleted or disabled by the access control module 255. In various embodiments, first order connections and second order connections to the target user or target object are used to determine the disable connectivity score for the target user or target object. Examples of first order connections and second order connections used to calculate a disabled connectivity score are further described above in conjunction with FIG. 1.

In one embodiment, a calculated disabled connectivity score is compared to various ranges each corresponding to actions for the social networking system 200 to take in response to the reported malicious activity. Examples of actions to for the social networking system 200 to take include: disabling or deleting objects maintained by the social networking system 200, ignoring the report, and additionally reviewing the report. When a disabled connectivity score indicates additional review of a report of malicious activity or content, the disabled connectivity scoring module 260 may compile information to aid in reviewing the report. For example, the disabled connectivity scoring module 260 may compile data about how often a target user has engaged in malicious activity and may organize the data according to the type of malicious activity in which the target user engaged.

The disabled connectivity scoring module 260 may differently weight signals from first order connections and from second order connections. In one embodiment, the disabled connectivity scoring module 260 associates higher weights with signals associated with first order connections and lower weights with signals associated with second order connections. For example, the percentage of users connected to a target user that have been disabled may be more heavily weighted than the percentage of disabled users who have liked a page administered by the target user when calculating a disabled connectivity score for the target user. In another embodiment, the social networking system 200 stores reasons why objects have been disabled or deleted and differently weights objects when calculating a disabled connectivity score for a target user based on a reason why an object was disabled or deleted. For example, the disabled connectivity scoring module 260 associates different weights with different types of malicious activity corresponding to a level of maliciousness of the activity (e.g., a higher weight is associated with child pornography than associated with spam). In yet another embodiment, a scoring process similar to calculation of a disabled connectivity score may be used to predict how strongly a target user is associated with a category other than malicious activity (e.g., a type of music or sport), by analyzing information associated with objects or users connected to the target user and determined by the social networking system 200 to be related to the category.

Machine-learned processes may be trained to incorporate data about objects confirmed to be associated with malicious content or activity or confirmed to not be associated with malicious content or activity into calculation of a disabled connectivity score. Additionally, machine-learned processes may be trained to incorporate results from manual review of reports of malicious activity or content into disabled connectivity score calculation to more accurately identify characteristics of content and activities likely to be malicious. For example, confirmed reports of malicious content posted by multiple users having shared interests may indicate that content posted by another user having a threshold number of interests matching the interests shared by the users posting confirmed malicious content is likely to be malicious. Different machine-learning processes may be used for disabled connectivity score calculation based on the types of available information associated with malicious activity and content.

Determining Action to be Taken in Response to a Report of Malicious Activity

Figure 3:
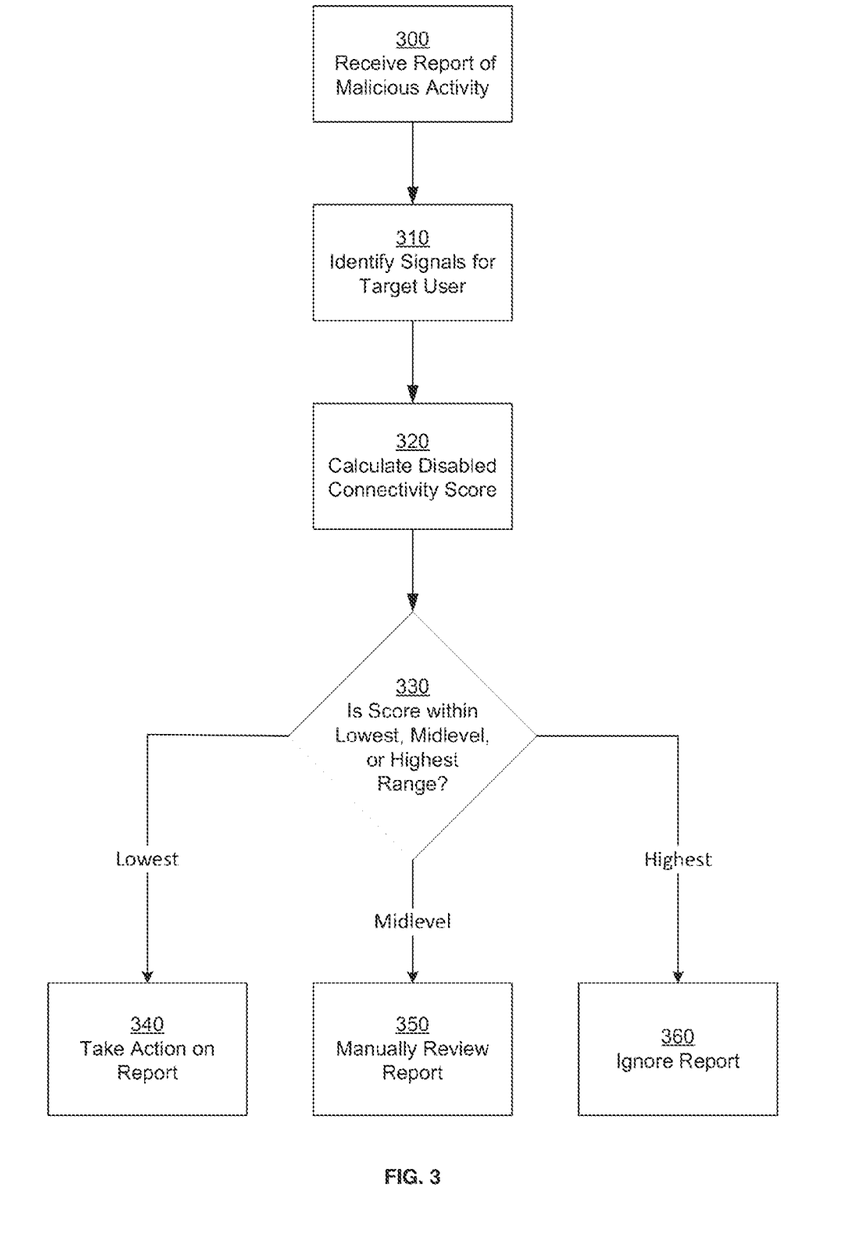
FIG. 3 is a flow chart of a method for determining an action to be taken in response to a report of malicious activity, in accordance with an embodiment of the invention.

FIG. 3 is a flow chart of one embodiment of a method for determining an action to be taken in response to a report of malicious activity. The social networking system 200 receives 300 a report of malicious activity from a target user. For example, the target user provides information identifying potentially malicious content or activity through a report interface generated by the interface generator 235. However, the report may be received 300 through any suitable communication channel. Users and objects connected to the target user via the social networking system 100 are retrieved, and signals for the target user are identified 310 from the connected users and objects. For example, information from one or more of the action store 230, the edge store 240, and the object store 245 is retrieved to identify objects or users connected to the target user. Information about the identified objects or users is analyzed to identify 310 the signals for the target user. Examples of signals for the target user are identified above in conjunction with FIG. 1.

For example, objects or users connected to the target user and that have been disabled or deleted are identified and signals are obtained from these objects or users. Based on the identified signals from the disabled or deleted objects or users connected to the target user, the disabled connectivity scoring module 260 calculates 320 a disabled connectivity score 320 for the target user. The disabled connectivity score provides a measure of the trustworthiness of the target user is. For example, if a high percentage objects directly or indirectly connected to the target user (i.e., first order connections and second order connections of the target user) have been disabled by the social networking system 200 for being malicious, the target user's disabled connectivity score is high, which indicates a lower level of trustworthiness for reports of malicious activity received from the target user.

In one embodiment, the disabled connectivity scoring module 260 determines 330 a range of values including the disabled connectivity score for the target user. Based on the range including the disabled connectivity score for the target user, a corresponding action is performed by the social networking system 200. For example, if the disabled connectivity score is determined 330 to be in a lowest range of values, the target user is determined to have a high level of trustworthiness and the social networking system 200 takes 340 a remedial action against a user or object identified by the report. For example, the object identified by the report is deleted or access to the identified object is disabled by the access control module 255. Alternatively, if the disabled connectivity score is determined 330 to be in a highest range of values, the target user is determined to have a low level of trustworthiness and the report is ignored 360. However, if the disabled connectivity score is determined 330 to be in a mid-level range of values, the report is manually reviewed 350 by social networking system administrators. For example, the report is included in a queue for manual review 350. One or more processes for confirming malicious activity or content, as described above in conjunction with FIG. 1, may also be performed to further review reports.

The target user may be the user from which the report was received 300 (the "reporting user") or may be another user associated with the received report. For example, the target user may be a user identified by the report to be engaged in malicious activity. Hence, a disabled connectivity score for the target user is determined based on signals including the percentage of reports of malicious activity identifying the target user that caused the social networking system 200 to take an action. In this example, a disabled connectivity score above a threshold may indicate that the target user is likely to be engaged in malicious activity and should be disabled while a disabled connectivity score below a threshold may indicate that the target user is not likely to be engaged in the activity, so no action should be taken.

A disabled connectivity score may be calculated for objects other than users. For example, a disabled connectivity score may be calculated for a post created by a user based on signals such as the percentage of users who commented on the post and who have been disabled, the percentage of deleted pages that were created by the user who created the post, or other similar data. In this example, a disabled connectivity score exceeding a threshold value may indicate the object is likely to include malicious content and should be disabled or deleted while a disabled connectivity score less than a threshold value may indicate that the object is not likely to include malicious content no action should be taken.

In some embodiments, the social networking system 200 assesses the potential maliciousness of objects maintained by the social networking system 200 without receiving a report of malicious activity. For example, the social networking system 200 may restrict content uploaded by a social networking system user if a disabled connectivity score indicating the user is likely engaged in malicious activity is stored in the user profile store 220. Alternatively, a disabled connectivity score for a target user may be calculated when a connection between the target user and an object is disabled based on a report of maliciousness (e.g., when an object is deleted, when a user's access to an object is restricted, etc.).

The social networking system 200 may prioritize the order in which received reports of malicious activity using the disabled connectivity score for an object or user associated with a report as a measure of the likely maliciousness of a reported activity. For example, the disabled connectivity scoring module 260 calculates a score for each reason objects connected to a target user or target object have been disabled or deleted with higher disabled connectivity scores corresponding to more malicious activities. Thus, the received reports may be ranked based on their associated disabled connectivity scores and addressed based on the ranking. For example, reports associated with higher disabled connectivity scores are ranked higher and addressed more quickly.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a report from a target user of a social networking system identifying malicious activity performed on the social networking system and identifying an object maintained by the social networking system associated with the malicious activity;
identifying objects connected to the target user through the social networking system and disabled by the social networking system;
retrieving information describing a type of remedial action taken by the social networking system to disable one or more of the identified objects connected to the target user;
calculating, by a computer processor, a disabled connectivity score for the target user based at least in part on the retrieved information, the disabled connectivity score indicating a trustworthiness of the report from the target user; and
performing an action affecting the object identified by the report based on the calculated disabled connectivity score.

2. The method of claim 1, further comprising storing the calculated disabled connectivity score for the target user.

3. The method of claim 1, wherein performing the action affecting the report based on the calculated disabled connectivity score comprises:
comparing the calculated disabled connectivity score with a plurality of ranges of disabled connectivity scores, each range of disabled connectivity scores associated with an action; and
selecting an action corresponding to a range of disabled connectivity scores that includes the calculated disabled connectivity score.

4. The method of claim 1, wherein calculating the disabled connectivity score comprises:
associating weights with each of the identified objects connected to the target user based in part on a reason for an identified object being disabled by the social networking system; and
determining the disabled connectivity score based at least in part on the associated weights.

5. The method of claim 1, wherein calculating the disabled connectivity score comprises:
associating weights with different types of remedial actions taken by the social networking system to disable one or more of the identified objects connected to the target user; and
determining the disabled connectivity score based at least in part on the associated weights.

6. The method of claim 1, wherein the one or more objects maintained by the social networking system connected to the target user is selected from a group consisting of: a user of the social networking system connected to the target user, a group of users of the social networking system connected to the target user, a page maintained by the social networking system connected to the target user, a report of malicious activity made by the target user to the social networking system, a user of the social networking system connected to an object maintained by the social networking system that is connected to the target user, and any combination thereof.

7. The method of claim 1, wherein the action comprises disabling the object identified by the report.

8. The method of claim 1, wherein the action is selected from a group consisting of: restricting access to information stored on the social networking system by the object identified by the report, deleting the object identified by the report, restricting access to the object associated with the report, and any combination thereof.

9. The method of claim 1, wherein the action comprises ignoring the report.

10. The method of claim 1, wherein the action comprises ordering the report into a review queue for additional review.

11. The method of claim 1, wherein the disabled connectivity score is based at least in part on one or more selected from a group consisting of: a frequency of interactions between the target user with one or more of the identified objects, a number of interactions between the target user and one or more of the identified objects, a number of the identified objects with which the user has interacted, and one or more types of interactions between the target user and one or more of the identified objects.

12. A method comprising:
retrieving one or more objects connected to a target object through a social networking system;
determining a subject associated with one or more of the retrieved objects connected to the target object;
retrieving interactions between the target object and one or more of the retrieved objects connected to the target object;

calculating by a computer processor, a score for the target object based at least in part on the retrieved interactions between the target object and one or more of the retrieved objects, the score providing a measure of association between the target object and the subject associated with one or more of the retrieved objects connected to the target object; and storing information describing the measure of association between the target object and the subject.

13. The method of claim 12, further comprising:
performing an action associated with the target object based on the score.

14. The method of claim 13, wherein performing the action associated with the target object based on the calculated score comprises:
comparing the calculated score with a plurality of ranges of scores, each range of scores associated with an action; and
selecting an action corresponding to a range of scores that includes the calculated score.

15. The method of claim 13, wherein the action is selected from a group consisting of: disabling a user account associated with the target object, restricting access of social networking system users to information associated with the target object, deleting the target object, deleting an object connected to the target object, and any combination thereof.

16. The method of claim 13, wherein the action comprises: restricting access of social networking system users to an object maintained by the social networking system and connected to the target object or restricting access of social networking system users to the target object.

17. The method of claim 13, wherein the action comprises ordering an object connected to the target object into a review queue for additional review based at least in part on the calculated score.

18. The method of claim 13, wherein the action comprises ordering the target object into a review queue for additional review based at least in part on the calculated score.

19. The method of claim 12, wherein calculating the score comprises:
associating weights with each of the retrieved objects connected to the target object based in part on a type of connection between a retrieved object and the target object; and
determining the score based at least in part on the associated weights.

20. The method of claim 12, wherein the one or more objects connected to a target object are selected from a group consisting of: one or more users of the social networking system connected to the target object, one or more groups of users of the social networking system connected to the target object, one or more pages maintained by the social networking system and connected to the target object, one or more reports associated with the target object made to the social networking system, one or more users of the social networking system connected to objects maintained by the social networking system and connected to the target object, and any combination thereof.

21. The method of claim 12, wherein the retrieved interactions between the target object and one or more of the retrieved objects connected to the target object are selected from a group consisting of: a frequency of interactions between the target object and a retrieved object, a number of interactions between the target object and the retrieved object, a number of the one or more retrieved objects with which the target object interacted, types of interactions between the target object and the one or more retrieved objects, and any combination thereof.

22. The method of claim 12, wherein the subject or interest comprises malicious activity performed on the social networking system.

23. The method of claim 12, further comprising:
disabling a connection between the target object and one or more of the retrieved objects based at least in part on the score.

* * * * *